(12) United States Patent
Krone et al.

(10) Patent No.: US 8,788,303 B1
(45) Date of Patent: Jul. 22, 2014

(54) FARE AVAILABILITY CALENDAR

(75) Inventors: Kevin M. Krone, Coppell, TX (US);
Byron C. Fisher, Denton, TX (US);
Steven F. Taylor, Dallas, TX (US);
Robert S. Shaffer, Plano, TX (US);
Kerry R. Schwab, Southlake, TX (US);
Joyce C. Rogge, Dallas, TX (US); Jason A. Chancellor, Coppell, TX (US)

(73) Assignee: Southwest Airlines Co., Dallas, TX (US)

( * ) Notice: Subject to any disclaimer, the term of this patent is extended or adjusted under 35 U.S.C. 154(b) by 1982 days.

(21) Appl. No.: 10/875,523

(22) Filed: Jun. 24, 2004

(51) Int. Cl.
*G06Q 10/00* (2012.01)

(52) U.S. Cl.
USPC ............................................................ 705/5

(58) Field of Classification Search
None
See application file for complete search history.

(56) References Cited

U.S. PATENT DOCUMENTS

| | | | |
|---|---|---|---|
| 2002/0065688 A1* | 5/2002 | Charlton et al. | 705/5 |
| 2002/0111935 A1* | 8/2002 | Jones et al. | 707/1 |
| 2002/0154166 A1* | 10/2002 | Sanders et al. | 345/764 |
| 2003/0018500 A1* | 1/2003 | Daughtrey | 705/5 |
| 2004/0078252 A1* | 4/2004 | Daughtrey et al. | 705/5 |

OTHER PUBLICATIONS

Travelocity, Airfare Search, Sample web page sequence from http://dpsl.travelocity.com, 11 pages.

* cited by examiner

*Primary Examiner* — Tonya Joseph
(74) *Attorney, Agent, or Firm* — Fish & Richardson P.C.

(57) ABSTRACT

A method and system for displaying fare availability involves receiving an identification of an origination location and a destination location for generating a travel itinerary. An availability for each of multiple fare classes is determined for each of multiple time periods. The availability corresponds to the origination location and the destination location. A calendar having a representation of the multiple time periods is displayed. The calendar includes a visual indication of one or more available fare classes for each of the multiple time periods. The calendar can display real time or substantially real time availability information for one or more fare classes.

44 Claims, 10 Drawing Sheets

Where are you traveling?

Depart: 305
- Albany, NY - ALB
- Albuquerque, NM - ABQ
- Amarillo, TX - AMA
- Austin, TX - AUS
- Baltimore, MD - BWI Arrive: 310
- Albany, NY - ALB
- Albuquerque, NM - ABQ
- Amarillo, TX - AMA
- Austin, TX - AUS
- Baltimore, MD - BWI Return: 315
- None
- Depart City/Round Trip
- Albany, NY - ALB
- Albuquerque, NM - ABQ
- Amarillo, TX - AMA

When are you traveling?

Depart Date:
- February
- March
- April
- May
- June 9 10 11 12 13 14

Depart Time: 320
- ● Before Noon
- ○ Noon - 6pm
- ○ After 6pm
- ○ Anytime

Return Date:
- February
- March
- April
- May
- June 6 7 8 9 10 11

Return Time: 325
- ● Before Noon
- ○ Noon - 6pm
- ○ After 6pm
- ○ Anytime

How many are traveling? 330

Passengers: 1

FIG. 3

Austin To Albuquerque

Select Departure Date...
February ▼ | 27 ▼

400'

| Available Fares | | |
|---|---|---|
| Display | Fare | Price |
| ☑ | Refundable Anytime (Y) | $228 |
| ☑ | Restricted Fares (B) | $201 |
| ✎ | Advance Purchase (Q) | $165 |
| ☑ | Fun Fares (H) | $145 |
| | Promotional Fares (M) | $99 - 139 |

Click on Update Calendar to display selected fare availability.

[ Update Calendar ]

405

February 2004

| Sun | Mon | Tue | Wed | Thu | Fri | Sat |
|---|---|---|---|---|---|---|
| 1 | 2 | 3 | 4 | 5 | 6 | 7 |
| 8 Y | 9 | 10 Q | 11 Q | 12 Q | 13 Q | 14 Q |
| 15 Q | 16 M | 17 M | 18 M | 19 M | 20 M | 21 M |
| 22 M | 23 | 24 | 25 | 26 | 27 | 28 |
| 29 | | | | | | |

◀◀ ◀       ▶ ▶▶

415'

March 2004

| Sun | Mon | Tue | Wed | Thu | Fri | Sat |
|---|---|---|---|---|---|---|
| | 1 M | 2 M | 3 M | 4 M | 5 M | 6 M |
| 7 M | 8 M | 9 M | 10 M | 11 M | 12 M | 13 Q |
| 14 | 15 | 16 | 17 | 18 | 19 | 20 |
| 21 | 22 | 23 | 24 | 25 | 26 | 27 |
| 28 | 29 | 30 | 31 | | | |

▶ Increase/Decrease range in week increments.
▶▶ Increase/Decrease range in month increments.
◀
◀◀

FIG. 4B

Albuquerque To Austin

Select Return Date...
February ▶ | 29 ▶

February 2004

| Sun | Mon | Tue | Wed | Thu | Fri | Sat |
|---|---|---|---|---|---|---|
| 1 | 2 | 3 | 4 | 5 | 6 | 7 |
| Y 8 | Y 9 | Y 10 | Y 11 | Y 12 | Y 13 | Y 14 |
| Y 15 | B 16 | B 17 | B 18 | B 19 | B 20 | B 21 |
| B 22 | H 23 | H 24 | H 25 | H 26 | H 27 | H 28 |
| H 29 | | | | | | |

March 2004

| Sun | Mon | Tue | Wed | Thu | Fri | Sat |
|---|---|---|---|---|---|---|
| | H 1 | H 2 | H 3 | H 4 | H 5 | H 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | | | |

◀▶ Increase/Decrease range in week increments.
◀◀▶▶ Increase/Decrease range in month increments.

Available Fares

| Display | Fare | Price |
|---|---|---|
| ☑ | Refundable Anytime (Y) | $228 |
| ☐ | Restricted Fares (B) | $201 |
| ☑ | Advance Purchase (Q) | $165 |
| ☐ | Fun Fares (H) | $145 |
| | Promotional Fares (M) | $99 - 139 |

Click on Update Calendar to display selected fare availability.

[Update Calendar]

FIG. 5B

Lowest Available Fares by Day

| | Refundable Anytime | Restricted Fares | Advance Purchase | Discount Fares | Internet One-way | Flight Specific (Noted by ☑) — 615 |
|---|---|---|---|---|---|---|
| Departure Fare | $143 | $131 - $117 | $97 | $88 | $83 | $63 |
| Return Fare | $143 | $131 - $117 | $97 | $88 - $80 | $83 | $63 |
| View | ☐ | ☐ | ☐ | ☐ | ☐ | ☐ |

Click to update calendar below with availability of selected fares.

[ Show Fare Availability ]

Departure Date... — 605

Departing Dallas Love To Lubbock

December ▼  5 ▶

December 2001

| Sun | Mon | Tue | Wed | Thu | Fri | Sat |
|---|---|---|---|---|---|---|
|  |  |  |  |  |  | 1 |
| 2 | 3 | 4 | 5 | 6 | 7 | 8 |
| 9 | 10☑ | 11 | 12☑ | 13☑ | 14 | 15 |
| 16 | 17 | 18 | 19☑ | 20☑ | 21☑ | 22 |
| 23 | 24 | 25 | 26 | 27☑ | 28 | 29 |
| 30 | 31☑ |  |  |  |  |  |

Return Date... — 610

Returning Lubbock To Albuquerque

December ▼  16 ▶

December 2001

| Sun | Mon | Tue | Wed | Thu | Fri | Sat |
|---|---|---|---|---|---|---|
|  |  |  |  |  |  | 1 |
| 2 | 3 | 4 | 5 | 6 | 7 | 8 |
| 9 | 10☑ | 11☑ | 12☑ | 13☑ | 14 | 15☑ — 620 |
| 16 | 17☑ | 18☑ | 19☑ | 20☑ | 21 | 22 |
| 23 | 24 | 25 | 26☑ | 27☑ | 28 | 29☑ — 620 |
| 30 | 31☑ |  |  |  |  |  |

[ Continue with Select Flight ]

Select Departing Flight - Austin To Albuquerque (Friday, February 27 2004)

Depart Time: Before Noon ▶  Depart Date: Friday, Feb 27 ▶

More Fares ⇦ | | | | | | End ⇨

| Flights | Departs | Arrives | Stops | Refundable Anytime $228 | Restricted Fares $201 | Advance Purchase $165 | Fun Fares $145 | Promotional Fares $99 - $139 |
|---|---|---|---|---|---|---|---|---|
| 2283/4 | 6:30am | 9:10am | DAL/1 | ○ | Unavailable | ○ | ○ | ○ |
| 553/1392 | 8:30am | 11:05am | MAF/1 | ○ | ○ | ○ | ○ | ○ |
| 2532/2784 | 9:45am | 1:05pm | ELP/1 | ○ | Unavailable | ○ | ○ | ○ |
| 1387/194 | 10:55am | 1:55pm | DAL/1 | ○ | Unavailable | ○ | ○ | ○ |

Select Returning Flight - Albuquerque To Austin (Sunday, February 29 2004)

Return Time: Before Noon ▶  Return Date: Sunday, Feb 29 ▶

More Fares ⇦ | | | | | | End ⇨

| Flights | Departs | Arrives | Stops | Refundable Anytime $228 | Restricted Fares $201 | Advance Purchase $165 | Fun Fares $145 | Promotional Fares $99 - $139 |
|---|---|---|---|---|---|---|---|---|
| 2526/1466 | 7:00am | 11:55am | DAL/1 | ○ | ○ | ○ | ○ | ○ |
| 21/2310 | 8:30am | 1:35pm | DAL/1 | ○ | ○ | ○ | ○ | ○ |
| 29/2661 | 9:45am | 2:35pm | DAL/2 | ○ | ○ | ○ | ○ | ○ |
| 2405/1789 | 10:55am | 4:50pm | DAL/1 | ○ | ○ | ○ | Unavailable | Unavailable |
| 803/1334 | 11:25am | 5:10pm | ELP/1 | ○ | Unavailable | Unavailable | Unavailable | Unavailable |

| DALHOU | Y | K | L | B | Q | H | M | V |
|---|---|---|---|---|---|---|---|---|
| 25OCT | 7 | 7 | 3 | 6 | 7 | 5 | 5 | 0 |
| 26OCT | 7 | 7 | 2 | 3 | 7 | 4 | 4 | 0 |
| 27OCT | 7 | 7 | 2 | 3 | 7 | 5 | 4 | 0 |
| 28OCT | 7 | 7 | 1 | 3 | 7 | 4 | 5 | 0 |
| 29OCT | 7 | 7 | 3 | 7 | 7 | 6 | 6 | 0 |
| 30OCT | 7 | 7 | 7 | 7 | 7 | 7 | 7 | 0 |
| 31OCT | 7 | 7 | 7 | 7 | 7 | 7 | 7 | 0 |
| 01NOV | 7 | 7 | 7 | 7 | 7 | 7 | 7 | 0 |
| 02NOV | 7 | 7 | 3 | 4 | 7 | 5 | 5 | 0 |
| ⋮ | | | | | | | | |
| 22NOV | 7 | 7 | 7 | 7 | 7 | 7 | 7 | 0 |
| 23NOV | 7 | 7 | 7 | 7 | 7 | 7 | 7 | 0 |

FIG. 8

FARE AVAILABILITY CALENDAR

TECHNICAL FIELD

This description relates to travel itineraries, and more particularly to displaying travel and fare availability information.

BACKGROUND

The proliferation of travel-related web sites providing information and booking services has given customers greater control over travel planning. Such web sites offer easy access to information about destinations, hotels, transportation, activities, and events. In addition, many travel-related web sites offer consumers the opportunity to make travel arrangements online without having to involve a travel agent or other booking agent. In the airline industry, for example, consumers are able to easily search for flights on specified travel dates and, as a result, to obtain a list of available flights and/or available itineraries. Typically, however, the flexibility of the search capabilities is limited to a relatively small set of search criteria. Many web-based search engines in the airline industry allow consumers to search by date and even by time. Some airline industry search engines also allow consumers to sort search results by total travel time, number of connections, or fare. The Travelocity.com web site also offers the capability to select from a list of specific fare classes for different airlines and display a calendar indicating which days the selected fare class on the selected airline is offered.

SUMMARY

Systems and techniques are described for displaying a fare availability calendar. The inventors recognized that existing travel-related search engines have a limited ability to allow users to conveniently customize searches for travel itineraries. In many cases, consumers' travel plans, especially for leisure and vacation travelers, are not necessarily constrained to particular dates. By allowing users of a travel-based web site to be able to view which days various fare classes are available, such users can more conveniently and efficiently select travel dates. For example, based on a selected a departure and destination location, a user can be presented with a calendar that visually represents the lowest-priced available fare class (or all available fare classes) for each day within a range of days displayed on the calendar. The user can then select desired travel dates from the calendar to view a list of available flights on the selected travel dates.

In one general aspect, fare availability information is displayed in response to receiving an identification of an origination location and a destination location for generating a travel itinerary. Availability for each of multiple fare classes is determined for multiple time periods. The availability corresponds to the origination location and the destination location. A calendar having a representation of the multiple time periods is displayed. The calendar includes a visual indication of one or more available fare classes for each of the multiple time periods.

Implementations can include one or more of the following features. Each time period corresponds to a day. The calendar is a visual representation of at least a week. The multiple fare classes further correspond to a set of fare rules and/or a class of service. The calendar includes a visual indication of a first available fare class for each time period in a first set of time periods and a visual indication of a second available fare class for each time period in a second set of time periods. The visual indication of the first available fare class uses a first color and the visual indication of the second available fare class uses a second color. The visual indication uses a color and/or a symbol associated with each available fare class. The calendar further includes a visual indication of one or more flight-specific fare classes for one or more of the time periods.

Prior to displaying the calendar, an identification of a requested travel date is received for generating the travel itinerary. The displayed calendar includes a representation of multiple days including the requested travel date. The calendar is displayed on a user interface, and a selection of a travel date is received through a user interaction with the user interface. In response to the selection, a list of available flights for the selected travel date is displayed. Available fares for the available flights are also displayed. A user selection of one or more flights in the list of available flights is received, and the one or more selected flights are booked in response to a submission by the user of the user selection. A selection of the fare classes from a list of fare categories is received through a user interface. The multiple time periods are days within a first range of dates, and the representation of each day includes the visual indication of one or more available fare classes.

A request to change the first range of dates displayed in the calendar is received, and a second range of dates is displayed in the calendar in response to the request. A representation of each day in the second range of dates includes a visual indication of one or more available fare classes. A determination is made, for one or more additional time periods, that none of the multiple fare classes are available for the one or more additional time periods, the calendar includes a visual indication for the one or more additional time periods that none of the fare classes are available. The determination, for a multiple time periods, of availability for each of multiple fare classes includes determining a number of available fares for each of the fare classes. An identification of a requested number of passengers for generating the travel itinerary is received, and the visual indication of one or more available fare classes for each of the time periods includes a visual indication of a fare class having a number of available fares at least as to numerous as the requested number of passengers.

In another general aspect, a computer system includes a reservation server that is operable to receive the identification of the origination location and the destination location for generating a travel itinerary, to request availability for the fare classes, and to generate a calendar display including a visual indication of one or more available fare classes for each day. The computer system further includes an availability server operable to determine availability for each of the fare classes in response to the request and to send data identifying the availability to the reservation server for use in generating the calendar display.

Implementations can include one or more of the following features. The availability server is further operable to determine a number of available fares for each available fare class. The availability server is further operable to generate a table identifying the number of available fares for each fare class for each day and to send the table to the reservation server. The request for availability includes the identification of the origination and destination locations and an identification of one or more dates in a predefined format. The reservation server is a web server. The reservation server sends the calendar display over a network to a remote client device for display on the remote client device. The reservation server is further operable to receive a selection of a travel date through a user interaction with the remote client device and to generate a display list of available flights for the selected travel date.

In another general aspect, a determination is made, for multiple time periods, of availability for each of multiple fare classes. The availability corresponds to one or more of received travel itinerary parameters, and data identifying the availability for each of the fare classes and for each of the time periods is generated.

The details of one or more implementations are set forth in the accompanying drawings and the description below. Other features will be apparent from the description and drawings, and from the claims.

DESCRIPTION OF DRAWINGS

FIG. 3 is an illustrative example of a user interface for entering certain travel itinerary parameters.

FIGS. 4A and 4B are illustrative examples of user interfaces for displaying a departure date calendar of available fare classes.

FIGS. 5A and 5B are illustrative examples of user interfaces for displaying a return date calendar of available fare classes.

FIG. 6 is another illustrative example of a user interface for displaying a calendar of available fare classes.

FIG. 7 is an illustrative example of a user interface for displaying flight availability information.

FIG. 8 is an example of a fare class availability data chart that can be generated by an availability server.

Like reference symbols in the various drawings indicate like elements.

DETAILED DESCRIPTION

Techniques can be implemented for allowing a user of a travel-related web site to select an origination location and a destination location for a possible travel itinerary. Using the origination and destination locations, availability for each of multiple different fare classes on each of multiple different days can be determined. A calendar that includes a visual representation of one or more available fare classes for each day can then be displayed to the user. The user can select from the calendar which days he or she would prefer to travel, based on the available fare class or classes, before being presented with a list of specific flights for the selected travel dates.

A fare class can be a set of fares for a travel leg or itinerary that have the same cost. Alternatively or in addition, a fare class can be a set of fares that have the same restrictions or rules. For example, common fare rules include whether round-trip travel is required, whether certain blackout dates exist, whether an overnight or Saturday night stay is required, whether the fare is refundable or nonrefundable, conditions for making changes, the length of an advance purchase requirement, and the like. Fare classes can also be based on other types of fare rules and/or restrictions. In some cases, fares in the same fare class may have different prices depending on certain fare rules. For example, a particular fare class may have a fare rule that specifies one price for travel on weekdays and another price for travel on weekends. In other implementations, however, the different prices for weekday and weekend travel may be segregated into different fare classes, even when all of the other rules and restrictions are the same. Some fare classes can also be flight-specific. For example, flight-specific fare classes can be used for promotional fares that are offered only on one or more specified flights. Fare classes can also, or alternatively, be based on classes of service or facilities (e.g., first class, business class, or coach class). For purposes of this description, the term "available" and "availability" in the context of a fare or fare class means that inventory exists (e.g., seats at the fare or in the fare class are available for purchase), while the term "offered" refers to the situation in which the fare or fare class is, for example, advertised but is not necessarily available.

Figure 1:
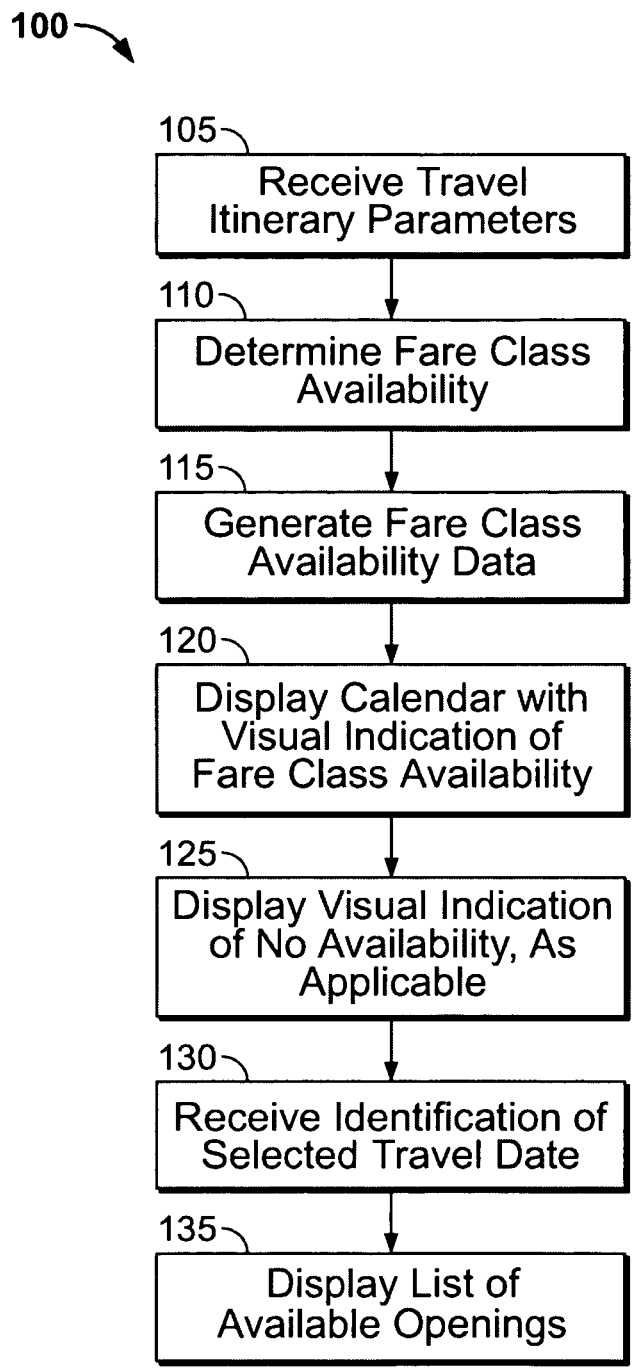
FIG. 1 is a flow diagram of a process for facilitating travel planning.

FIG. 1 is a flow diagram of a process 100 for facilitating travel planning. The process 100 includes receiving desired travel itinerary parameters (step 105). The travel itinerary parameters can be used to generate a travel itinerary and can include an identification of an origination location, a destination location, a desired travel date or dates, and a number of passengers. Typically, a user selects the travel itinerary parameters. However, some of the travel itinerary parameters can be set to a default value in some implementations or if the user does not make a selection. For example, the origination location can be stored as part of a user's profile information and the desired travel date can be set to the current date or the next day's date.

The travel itinerary parameters relate to a desired travel itinerary that can be fulfilled using one or more of at least two different fare classes. In a typical implementation, a travel itinerary can be fulfilled using at least one of three or more different fare classes. For example, a desired travel itinerary can involve a round-trip airline travel from Phoenix to San Jose. Each one-way leg of the airline travel might have five possible fare classes. A travel itinerary can be planned such that both one-way legs of the round-trip travel are from the same fare class. In some implementations, constraints may be imposed such that both one-way legs must be in the same fare class. In some cases, however, each one-way leg can be from a different fare class.

In some implementations, the travel itinerary parameters can include an identification of a selected subset of the full set of possible fare classes from which a user wants to select a particular travel itinerary. For example, the user may want to avoid travel on the highest-priced fare classes or on fare classes with certain restrictions. As a default, however, all of the possible fare classes or a predetermined subset of fare classes are assumed to be selected.

A determination is made as to an availability for each of the selected fare classes (step 110). The determination of availability is made for multiple different days and in accordance with identified travel itinerary parameters. The determination can be made, for example, by querying a database that stores fare and fare class availability information. By making the determination in real time (i.e., as the travel itinerary parameters are received and in response to minute-by-minute or second-by-second changes in availability) or substantially in real time, the availability determination can substantially ensure that seats/bookings are available for each fare class. Continuing with the above example, the multiple different days can include each day for the next four weeks, the next month, or the next six months. For each day, a determination is made as to which fare classes are available on flights from Phoenix to San Jose and from San Jose to Phoenix. Certain fare classes may be sold out on particular days and/or may not be available (or offered) based on fare rules for the fare classes (e.g., fare classes that require a fourteen day advance purchase are not available for travel dates less than fourteen days in the future). Accordingly, some days may have only a subset of the possible fare classes available, while other days may have all of the possible fare classes available. Each day can have multiple flights, but the determination is made based on all of the flights for the day. As a result, one day may have availability for one fare class on a first flight but not on a second flight, while a second fare class may be available on a second flight but not on the first. The day, as a whole, however, has availability on both fare classes. If the travel itinerary parameters include a desired travel date or dates, either by an explicit user-selection or by default, the days for which fare class availability is determined include the desired travel date or dates.

In some implementations, a period of time other than a day can be used for determining availability. Each day can be divided into multiple time periods (e.g., morning, day, and evening) or days can be combined into consolidated time periods (e.g., weeks, weekdays, weekends, and the like).

The availability determination can also involve determining a number of fares available for each fare class. The number of fares available for a particular fare class represents the number of purchases that can be made for the particular fare class. The number of fares available for the particular fare class does not necessarily correspond to the number of seats or other booking openings available. For example, a flight may have twenty available seats, but only six fares in the particular fare class. The remaining fourteen seats may only be available in connection with a different fare class. The number of fares available can be determined on an entire day basis or, in the case of an airline travel implementation, a flight-by-flight basis. This information can be useful, for example, if the travel itinerary parameters include a number of passengers greater than one. If four passengers are indicated by the travel itinerary parameters but only two fares for a particular fare class are available, this information can be used to determine that the fare class is not available or to notify a user that fewer than the requested number of fares are available for the particular fare class.

Data identifying the availability of each of the fare classes for each of the days is generated (step 115). The fare class availability data can be generated in the form of a table or in some other predetermined format. In some implementations, the fare class availability data can be generated at a first location and/or by a first processor or server and sent to a second location and/or a second processor or server for further processing.

Using the fare class availability data, a calendar that includes a representation of each of the days is displayed (step 120). Each day represented on the calendar includes a visual indication of one or more available fare classes (unless there are no seats/bookings available on the specified day). An indication of fares class availability is not displayed for fares classes that are merely offered without being actually available. In other words, a visual indication of a particular fare class is not displayed unless seats/bookings in that fare class are actually available for purchase. The calendar can include a week, a month, multiple months, or some predetermined number of days (e.g., four weeks). If the travel itinerary parameters include a desired travel date or dates, either by an explicit user-selection or by default, the days for which fare class availability is displayed include the desired travel date or dates.

The days for which fare class availability is displayed can be within a sliding window. For example, fare class availability can be shown for four consecutive weeks. The four-week window can be moved forward or back by a day, a week, and/or to the next adjacent four-week period. When a request to move the sliding four-week window is received, the display of fare class availability is changed to show a visual indication of fare class availability for the days in the new four-week window. In some implementations, fare class availability is determined anew, at least for the days for which a determination was not originally made, and data identifying the fare class availability in the new four-week window is generated. In other implementations, the original determination and the original generated data can include fare class availability for a larger number of days than are displayed at any given time, and thus the data for the new four-week window can already be readily accessible.

In some implementations, the calendar can include a representation of more days than the number of days for which fare class availability is displayed. For example, if a sliding four-week window is used, the calendar can include a representation of two adjacent months, and the sliding four-week window can span both months. Even though two months are represented, the fare class availability is only shown for the days that are within the sliding four-week window.

The visual indication can include a color associated with each fare class. Days on which a particular fare class is available can be shaded with the color that corresponds to the particular fare class. Alternatively or in addition, the visual indication can include a symbol associated with each fare class. The symbol can be a number, letter, code, abbreviation, text, icon, or image that corresponds to the particular fare class and that is included with days on the calendar for which the particular fare class is available. Other visual indications can also be used.

In some implementations, the fare classes can be arranged in a preferential hierarchy. For example, less expensive fare classes can be favored over more expensive fare classes. The visual indication for a particular day can correspond only to the most preferred fare class (e.g., the lowest-priced fare class) that is available. Accordingly, a particular day can be shaded with only one color (i.e., corresponding to the most preferred available fare class) even though several fare classes are available for that day. In other implementations, each day can include a visual indication of multiple (or all) of the available fare classes. Thus, each day can include multiple color boxes and/or multiple symbols corresponding to the available fare classes. In still other implementations, the calendar can include a visual indication only for the most preferred available fare class, except on days for which a specific fare class (e.g., a flight-specific fare class) is available, in which case an additional visual indication corresponding to the specific fare class can be included for such days.

In some implementations, the calendar can include a representation of time periods having a length other than a day. Each day can be divided into multiple time periods (e.g., morning, day, and evening) or days can be combined into consolidated time periods (e.g., weeks, weekdays, weekends, and the like). The visual indication of at least one available fare class can be included for each time period represented on the calendar.

Some days may not have any available fares from the selected fare classes. For example, if the user only opts to display fare classes that require an advance purchase, days that do not meet the advance purchase requirements will not have availability for the selected fare classes. In addition, all of the selected fare classes can be sold out on some days. Accordingly, the determination at step 110 can include a determination that none of the selected fare classes are available for particular days, and the data generated at step 115 can include an indication that none of the selected fare classes are available for the particular days. If it is determined that the data indicates that none of the selected fare classes are available, the calendar can include a visual indication that none of the selected fare classes are available (step 125). The visual indication that none of the selected fare classes are available can include another color (e.g., black or white) and/or a symbol.

The calendar is typically displayed on a user interface. For example, the calendar display can be generated by a server and sent to a user's computer, and the user interface can be displayed on a monitor connected to the user's computer. A user can select a travel date from the displayed calendar through the user interface. For example, the user can click on a day within the displayed calendar using a mouse or other pointing device. Alternatively, the user can select a date from a pull-down menu displayed on the same page as the calendar. An identification of the selected travel date is received (step 130) (e.g., by the server that generates the calendar display). In response to the selection, a list of available flights, seats, bookings, or other openings for the selected travel date can be displayed (step 135). The displayed list of available openings or flights can further include the available fares and/or fare classes for each opening or flight. In some implementations, a chart can be used to display the available flights along one axis, the possible fares/fare classes along another axis, and an indication of availability for a particular flight and a particular fare/fare class at an intersection of the row and column where the particular flight and the particular fare/fare class are located. The user can select from the displayed list to indicate the desired flights, seats, bookings, or other openings and can book a reservation or complete a purchase by submitting the selection(s). In some cases, however, the user may need to enter payment (e.g., credit card) information after the submitting selection(s).

In some cases, such as when fare availability is displayed for round-trip travel, the fare class availability can differ for the outbound trip and the inbound or return trip. In some implementations, two separate calendars can be used, one for the outbound trip and one for the inbound trip. The two calendars can be displayed simultaneously (e.g., on the same web page) or the second calendar (i.e., for the inbound trip) can be displayed after the user has viewed and made a selection (e.g., for a specific flight for the outbound trip) from the first calendar. In other implementations, the calendar can divide each day into two parts, one for the outbound trip and one for the inbound trip. Each part can then include a visual indication of the fare class availability for the corresponding direction of travel.

In addition, the available fare classes for the inbound trip can change depending on the selections made for the outbound trip. For example, certain fare classes can have restrictions that require or preclude pairing the fare class with one or more other fare classes. In such a case, the fare class availability shown on the second calendar can change once a selection is made from the first calendar.

Figure 2:
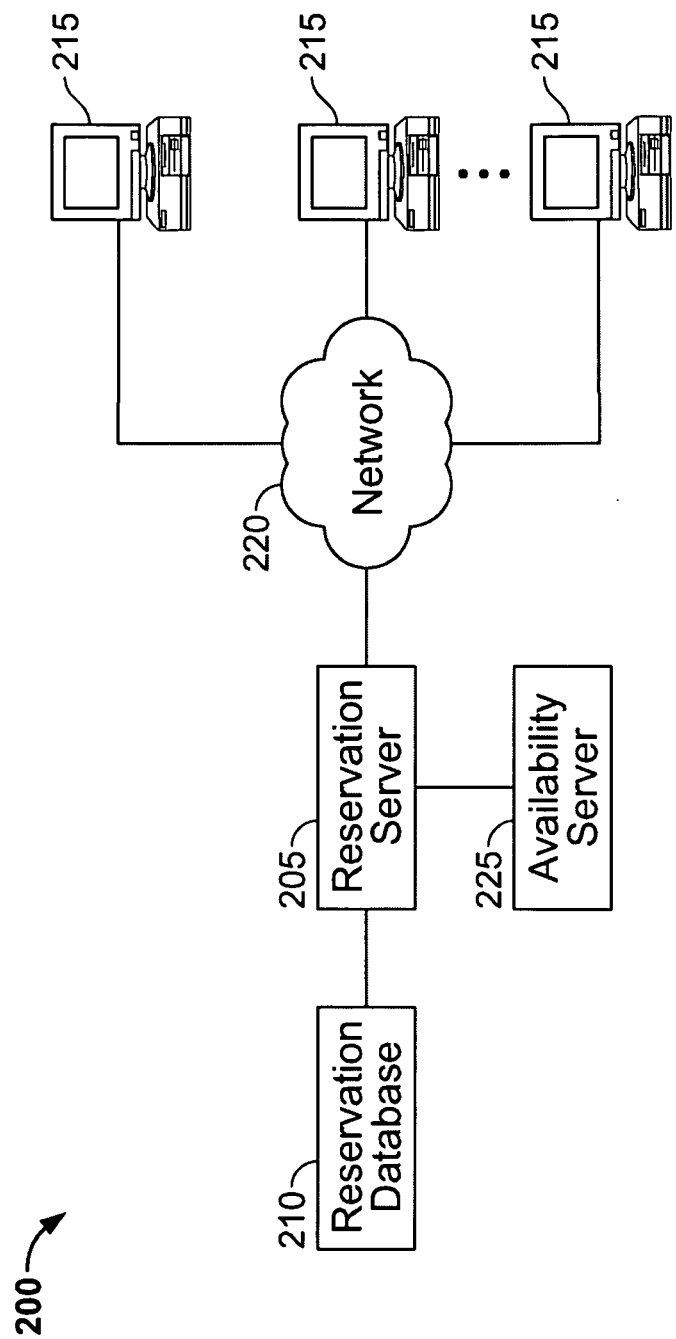
FIG. 2 is a block diagram of a reservation system.

FIG. 2 is a block diagram of a reservation system 200. The reservation system 200 includes a reservation server 205, which can be a web server. The reservation server 205 maintains a reservation database 210, which stores data relating to individual reservations. The stored data for each reservation can include, for example, a reservation number, a name or names, dates, flight numbers or other similar identifiers, departure and arrival times, and other itinerary information. The reservation server 205 also communicates with client devices 215 through a network 220, such as a local area network, a wide area network, and/or the Internet. The reservation server 205 supports a web site or web pages that can be displayed on the client devices 215 to allow users to view and book reservations. For example, the reservation server 205 can generate web pages that solicit certain travel itinerary parameters from users through user interfaces on the client devices 215.

The reservation server 205 further operates to request fare availability information by sending one or more travel itinerary parameters to an availability server 225, which manages availability for travel itineraries. The travel itinerary parameters can include user-specified parameters and/or parameters that are defined in or by the reservation server 205. Availability data is stored in and accessed from an availability database 230. The availability database 230 stores fare class availability for each possible booking unit length (e.g., flight, leg, or trip). Using the received travel itinerary parameters, the availability server 225 accesses data in the availability database 230 to determine fare class availability. The fare class availability is determined for multiple different days for a travel itinerary that corresponds to the travel itinerary parameters. The availability server 225 can maintain up-to-the-minute or up-to-the-second data defining the number of available seats or bookings for each fare class. The availability server 225 sends the fare class availability data (e.g., in the form of a chart, an XML file, or other data structure) to the reservation server 205. In this manner, the reservation server 205 has access to real time or substantially real time availability information for use in presenting to the user. In some cases, the availability server 225 may generate an error message. For example, the travel itinerary parameters may indicate an invalid origination/destination pair, a past start date, an invalid date format, or an invalid number of days (e.g., more than an allowed maximum). In such a case, an error message can be returned to the reservation server 205.

The reservation server 205 uses the received fare class availability data to generate a calendar display that includes a visual indication of one or more available fare classes for each day or other time period represented on the calendar. The calendar display is sent to the appropriate client device 215 (i.e., the client device 215 for the user that submitted the travel itinerary parameters), where the calendar is displayed on a user interface. The user can interact with the reservation server 205 through the user interface to change the range of dates for which fare class availability is shown. In addition, the user can select dates from the calendar to obtain more detailed availability and booking information and to book a reservation. When the user books a reservation, the reservation server 205 stores the reservation data for the booking in the reservation database 210. The reservation server 205 also notifies the availability server 225 of the booking, including the fare class or classes that were booked, and the availability server 225 updates the availability data stored in the availability database 230.

FIG. 3 depicts an illustrative example of a portion of a user interface 300 for entering certain travel itinerary parameters. The user interface 300 includes a scrollable menu 305 for selecting an origination location, a scrollable menu 310 for selecting a destination location, and a scrollable menu 315 for selecting a location for a return trip (i.e., none for a one-way trip, departure city for round-trip travel, or some other location for a multi-destination trip). A user can select the origination location, the destination location, and the return trip location by highlighting the desired locations on the different scrollable menus 305, 310, and 315. The user interface 300 also includes components 320 for selecting a desired or preferred departure date and time and components 325 for selecting a desired or preferred return date and time. The user interface 300 further includes a drop-down menu 330 for selecting a number of passengers.

Once a user indicates that his or her selection of travel itinerary parameters is complete (e.g., by clicking on a "next" or "continue" button with a mouse or other pointing device), the user can be presented with a web page that lists flights meeting the requirements presented by the travel itinerary parameters. The web page can also include a link or button for indicating that the travel dates are flexible. If the user selects the link or button indicating that the travel dates are flexible, the user can be presented with a web page for displaying a calendar that includes a visual representation of the fare class availability for the origination location, the destination location, the return trip location, and the selected number of passengers. The days displayed on the calendar include the selected departure date along with multiple other days. In an alternative implementation, the web page that includes the calendar can be displayed directly in response to the user's indication that the selection of travel itinerary parameters is complete.

Figure 4A:
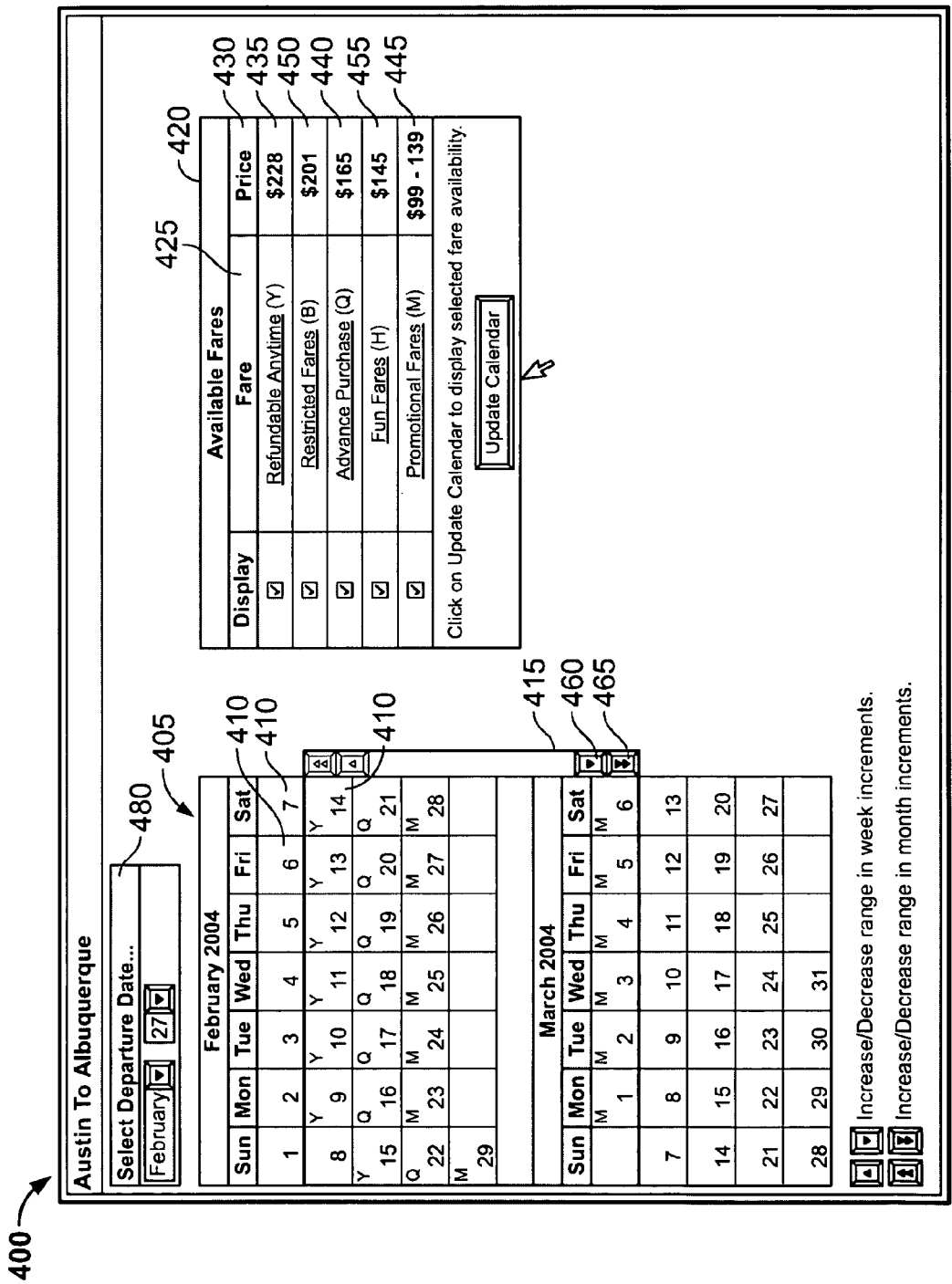

FIG. 4A depicts an illustrative example of a portion of a user interface 400 for displaying a departure date calendar of available fare classes. The user interface 400 is displayed after the user has selected travel itinerary parameters as described in connection with FIG. 3. The user interface 400 includes a calendar 405, which, in this example, spans two months (i.e., February and March 2004) and includes a separate box 410 representing each day within the two-month time frame. A sliding four-week window 415 is displayed on the calendar 405. Within the sliding four-week window 415, a visual indication of the fare class availability for the lowest-priced available fare class is shown for each day. The visual indication includes a fill color for the box 410 corresponding to each day and a one-letter code inside each box 410. In addition, the user interface 400 includes a legend 420 of available fare classes. The legend 420 includes a list 425 of the fare classes, a list 430 of the corresponding prices or price range for each fare class, and the visual indications that correspond to each fare class.

In this example, a first color (e.g., red) and the letter code "Y" are associated with a "refundable anytime" fare class 435, which is the lowest-priced fare class that is available on February 9-15. A second color (e.g., purple) and the letter code "Q" are associated with an "advance purchase" fare class 440, which is the lowest-priced fare class that is available on February 16-22. A third color (e.g., teal) and the letter code "M" are associated with a "promotional fares" fare class 445, which is the lowest-priced fare class that is available on February 23-March 6. In addition, a fourth color (e.g., green) and the letter code "B" are associated with a "restricted fares" fare class 450 and a fifth color (e.g., orange) and the letter code "H" are associated with a "fun fares" fare class 455, although neither the "restricted fares" fare class 450 nor the "fun fares" fare class 455 are the lowest-priced available fare class on any of the days within the sliding four-week window 415.

The sliding four-week window 415 includes buttons 460 and 465 for moving the sliding four-week window 415 by a week or four weeks, respectively. FIG. 4B depicts an illustrative example of a portion of a user interface 400' for displaying a departure date calendar of available fare classes after a selection of the button 460 in FIG. 4A. The user interface 400' includes a sliding four-week window 415' that encompasses February 15-March 13, instead of February 8-March 6 as in FIG. 4A. A visual representation of the available fare classes is shown for each of the dates within the sliding four-week window 415'.

Figure 5A:
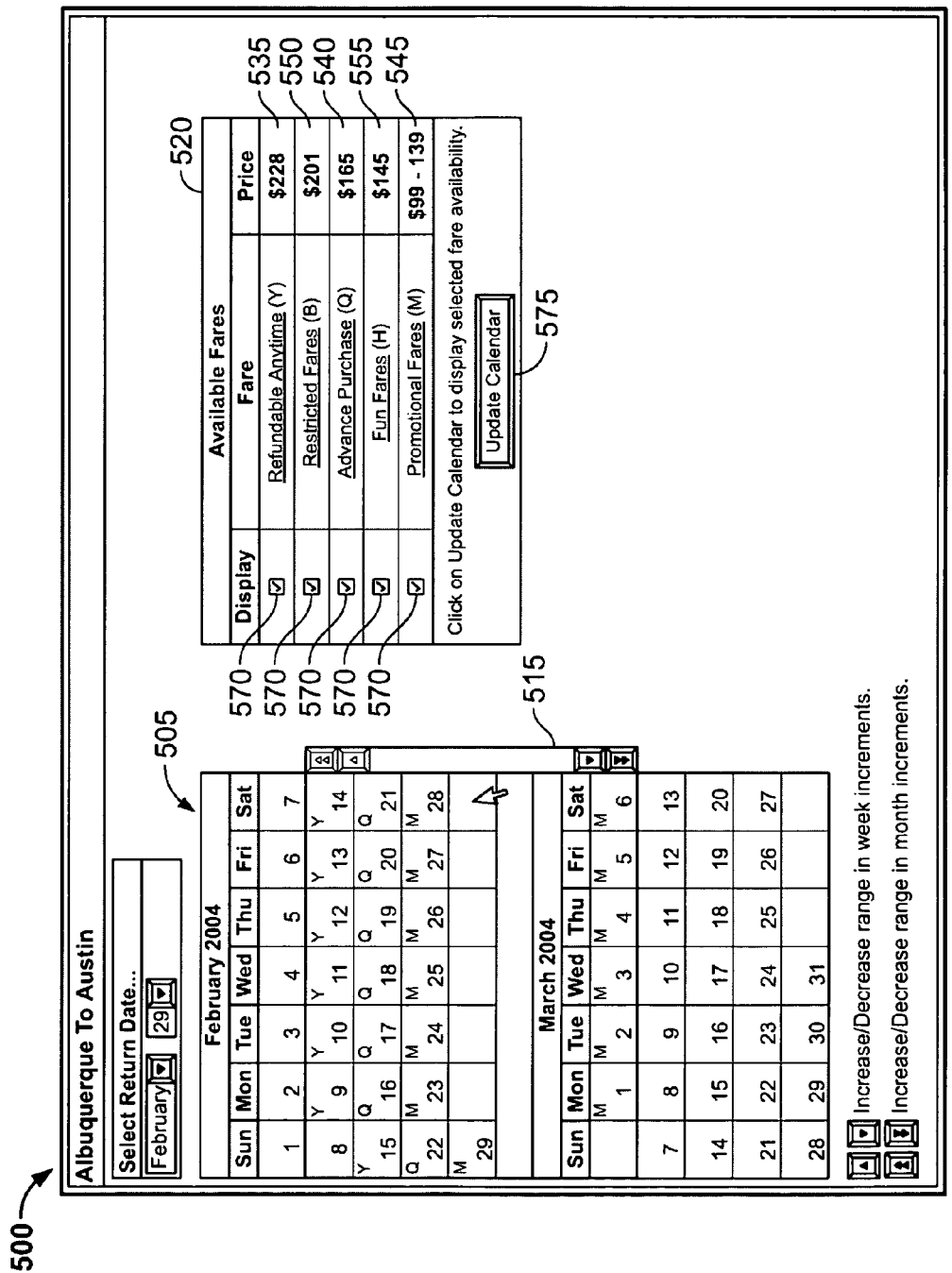

FIG. 5A depicts an illustrative example of a portion of a user interface 500 for displaying a return date calendar of available fare classes. The user interface 500 for the return date calendar is similar to the user interface 400 for the departure date calendar. The primary difference is that the fare class availability can be different for the return date calendar than for the departure date calendar, although in this example the visual indications of fare class availability are the same between the calendars in FIGS. 4A and 5A. The user interface 500 includes a sliding four-week window 515 and a legend 520 of available fare classes. The legend 520 includes a checkbox 570 for each fare class that can be used for selecting fare classes 535, 540, 545, 550, and 555 for which availability is shown in the sliding four-week window 515. In the example illustration of FIG. 5A, all of the checkboxes 570 are selected and thus all of the fare classes are eligible to be shown in the sliding four-week window 515. In this example, because a visual indication is displayed only for the lowest-priced fare class on each date, some of the eligible fare classes (i.e., the "restricted fares" fare class 550 and the "fun fares" fare class 555) are not represented in the sliding four-week window 515 (e.g., because they are sold out, unavailable, or other available fare classes are lower priced). If a user wants to omit particular fare classes and/or to focus on selected fare classes, the user can deselect certain checkboxes 570 and then select an "update calendar" button 575 to apply the changes.

FIG. 5B depicts an illustrative example of a portion of a user interface 500' for displaying a return date calendar of available fare classes after a user has changed the eligible fare classes. In particular, relative to the user interface 500 of FIG. 5A, the user interface 500' displays a calendar of available fare classes for particular fare classes 535, 550, and 555 after the checkboxes 570 for other fare classes 540 and 545 have been deselected and the calendar has been updated. After the update, the calendar 505 includes a sliding four-week window 515' with visual indications of available fare classes only for the eligible fare classes 535, 550, and 555.

FIG. 6 depicts another illustrative example of a portion of a user interface 600 for displaying a calendar of available fare classes. The user interface 600 includes a full month availability calendar 605 for selecting the departure date and a full month availability calendar 610 for selecting the return date. In contrast to the user interfaces 400, 400', 500, and 500' of FIGS. 4A-5B, the visual indications of fare class availability for the user interface 600 of FIG. 6 are not limited to a four-week period, but the departure calendar 605 and the return calendar 610 only include a single month, instead of a two-month period. Typically, the displayed month is the month that includes the current date or the departure or return date specified by the user. The user interface 600 also does not include codes corresponding to each fare class. In addition, the user interface 600 of FIG. 6 includes a different set of fare classes from the prior user interfaces 400, 400', 500, and 500', including a "flight-specific" fare class 615, which represents special fares that are offered only on selected flights. Dates with availability for a "flight-specific" fare class 615 include a special symbol 620. As a result, dates with availability for a "flight-specific" fare class 615 can include more than one indication of fare class availability (i.e., the special symbol 620 and a color corresponding to another fare class).

Referring again to FIG. 4A, a user can select a particular travel date using the user interface 400 by selecting a date on the calendar 405 (e.g., using a mouse or other pointing device to click within a box 410 corresponding to the date to be selected) or by using a set of pull-down menus 480 to specify a date. Once the user has selected the departure date and a return date, if applicable, a "continue" or "select flights" button (not shown) can be provided. A selection of the "continue" or "select flights" button can result in generating a new user interface with a list of available flights.

FIG. 7 depicts an illustrative example of a portion of a user interface 700 for displaying flight availability information. The user interface 700 includes a chart that lists available flights 705 versus available fare classes 710 for both a departing flight and a returning flight. In addition, the chart indicates (at 715) which fare classes are available for each flight. The list of available fare classes 710 includes a display of the fares for the available flights. By selecting a particular flight and fare class combination (e.g., at 720) for the departing and returning flight, additional user interfaces showing more detailed flight reservation information and requesting user payment information can be displayed.

Referring again to FIG. 2, when the reservation server 205 requests fare availability information by sending one or more travel itinerary parameters to an availability server 225, the request can be sent in a predefined format. For example, the request may include a string in the form of "date/city1/city2/number," where "date" represents a starting date for the fare class availability data or a travel date and is in a predefined date format, "city1" represents a three letter code for the departure city, "city2" represents a three letter code for the arrival city, and "number" represents a number of days of information requested. For example, the reservation server can request only four weeks of information at a time or can request a larger number of days to avoid having to send additional requests if, for example, the user opts to move the sliding four-week window.

After generating the fare class availability information, the availability database 230 sends the fare class availability data to the reservation server 205. FIG. 8 is an example of a fare class availability data chart 800 that can be generated by the availability server 225. The chart 800 includes an indication of the departure and arrival city pair 805. Each column of the chart 800 corresponds to a fare class and includes a fare class code 810 in the first row of the column. Each row of the chart 800 corresponds to a date and includes a date code 815 in the first column of the row. The table 800 further includes data entries 820 that, in this case, indicate the maximum number of available seats on any one flight for the corresponding date and fare class. After the table 800 is received by the reservation server 205, the data entries 820 can be used, for example, to determine whether a particular fare class includes a sufficient number of seats on at least one flight to accommodate a number of passengers specified by the user.

The described techniques can be implemented in digital electronic circuitry, integrated circuitry, or in computer hardware, firmware, software, or in combinations thereof. Apparatus for carrying out the techniques can be implemented in a software product (e.g., a computer program product) tangibly embodied in a machine-readable storage device for execution by a programmable processor; and processing operations can be performed by a programmable processor executing a program of instructions to perform the described functions by operating on input data and generating output. The techniques can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory, a random access memory, and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the techniques can be implemented on a computer system having a display device such as a monitor or LCD (liquid crystal display) screen for displaying information to the user and a keyboard and a pointing device such as a mouse or a trackball by which the user can provide input to the computer system or a system which enables input and presents information via voice, symbols, or other means such as a Braille input and output system. The computer system can be programmed to provide a graphical user interface through which computer programs interact with users. With new technologies such as voice input and output, it is not a requirement to have a visual display to implement all of the described techniques.

The invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

As used herein, the term "machine-readable medium" refers to any computer program product, apparatus, and/or device used to provide machine instructions and/or data to a machine, including a machine-readable medium that receives machine instructions as a machine-readable signal. Examples of a machine-readable medium include a storage medium, a memory, and/or PLDs, FPGAs, ASICs, and the like.

A number of implementations have been described. Nevertheless, it will be understood that various modifications may be made. For example, although various examples are described in the context of airline travel, the described techniques can be implemented in connection with other types of travel. Accordingly, other implementations are within the scope of the following claims.

What is claimed is:

1. A computer-implemented method for displaying fare availability, the method comprising: receiving an identification of an origination location for generating a travel itinerary, wherein the origination location is identified through a selection on a user interface; receiving an identification of a destination location for generating the travel itinerary, wherein the destination location is identified through a selection on a user interface;
   determining by operation of a processor, for a plurality of time periods and for travel from the origination location to the destination location, an availability for each of a plurality of fare classes, wherein each time period defines a time range from a beginning time to an ending time, with the plurality of time periods collectively spanning more than one date;
   displaying on a display device a fare selection interface including a graphical representation for each of a plurality of available fare classes, each of the available fare classes having an availability for at least one of the plurality of time periods, the graphical representation of each available fare class in the fare selection interface including:
   a visual indication associated with the fare class, a price associated with the fare class, and a selection control that allows a user to select whether the fare class is to be included in a calendar;
   receiving an identification of a plurality of selected fare classes selected through the fare selection interface, the selection controls for each of the plurality of selected fare classes individually selected by a user from the plurality of available fare classes represented in the fare selection interface; and
   periods and the visual indications associated with the plurality of selected fare classes in a single calendar window, wherein the visual indication associated with each selected fare class is displayed in the calendar to indicate one or more of the time periods for which each selected fare class has availability.

2. The method of claim 1 wherein each time period corresponds to a day.

3. The method of claim 2 wherein the calendar comprises a visual representation of at least a week.

4. The method of claim 1 wherein each of the plurality of fare classes further corresponds to at least one of a set of fare rules or a class of service.

5. The method of claim 1 wherein the calendar includes a visual indication associated with a first selected fare class for each time period in a first set of time periods and a visual indication associated with a second selected fare class for each time period in a second set of time periods.

6. The method of claim 5 wherein the visual indication associated with the first selected fare class comprises a first color and the visual indication associated with the second selected fare class comprises a second color.

7. The method of claim 1 wherein each visual indication in the calendar comprises a color associated with one of the selected fare classes.

8. The method of claim 1 wherein each visual indication in the calendar comprises a symbol associated with one of the selected fare classes.

9. The method of claim 1 wherein the calendar further includes a visual indication associated with at least one flight-specific fare class for at least one of the time periods.

10. The method of claim 1 further comprising receiving, prior to displaying the calendar, an identification of a requested travel date for generating the travel itinerary, wherein the displayed calendar includes a representation of a plurality of days including the requested travel date.

11. The method of claim 1 wherein the calendar is displayed on a user interface, the method further comprising:
    receiving a selection of a travel date through a user interaction with the user interface; and
    displaying a list of available flights for the selected travel date.

12. The method of claim 11 further comprising displaying available fares for the available flights.

13. The method of claim 11 further comprising:
    receiving a user selection of at least one flight in the list of available flights; and
    booking the at least one selected flight in response to a submission by the user of the user selection.

14. The method of claim 1 wherein the plurality of time periods comprise days within a first range of dates, with the representation of each day including the visual indication associated with at least one selected fare class, the method further comprising:
    receiving a request to change the first range of dates displayed in the calendar; and
    displaying a second range of dates in the calendar in response to the request, wherein a representation of each day in the second range of dates includes a visual indication associated with at least one selected fare class.

15. The method of claim 1 further comprising:
    determining, for at least one additional time period, that none of the plurality of fare classes are available for the at least one additional time period; and
    wherein the calendar includes a visual indication for the at least one additional time period that none of the plurality of fare classes are available.

16. The method of claim 1 wherein determining, for a plurality of time periods and for travel from the origination location to the destination location, an availability for each of a plurality of fare classes comprises determining a number of available fares for each of the plurality of fare classes.

17. The method of claim 16 further comprising:
    receiving an identification of a requested number of passengers for generating the travel itinerary; and
    wherein each selected fare class has a number of available fares at least as numerous as the requested number of passengers.

18. A computer system comprising: a reservation server comprising one or more processors configured to: receive an identification of an origination location for generating a travel itinerary;
    receive an identification of a destination location for generating the travel itinerary;
    request an availability for a plurality of fare classes for travel from the origination location to the destination location;
    generate a fare selection interface including a graphical representation for each of a plurality of available fare classes, each of the available fare classes having an availability for at least one of a plurality of days, the graphical representation of each available fare class in the fare selection interface including: a visual indication associated with the fare class, a price associated with the fare class, and a selection control that allows a user to select whether the fare class is to be included in a calendar; receive an identification of a plurality of selected fare classes selected through the fare selection interface, the selection controls for each of the plurality of selected fare classes individually selected by a user from the plurality of available fare classes represented in the fare selection interface; and generate a calendar display having a representation of a plurality of days and the visual indications associated with the plurality of selected fare classes in a single calendar window, wherein the visual indication associated with each selected fare class is displayed in the calendar to indicate one or more of the days for which each selected fare class has availability; and an availability server comprising one or more processors configured to: determine, for the plurality of days, an availability for each of the plurality of fare classes in response to the request; and send data identifying the availability for each of the plurality of fare classes to the reservation server for use in generating the calendar display.

19. The system of claim 18 wherein the identification of the origination location and the identification of the destination location are received through a user interface on a client device.

20. The system of claim 19 wherein the reservation server is further operable to receive an identification of a requested travel date through the user interface on the client device and the plurality of days includes the requested travel date.

21. The system of claim 18 wherein the representation of a first day includes a visual indication associated with a first selected fare class and the representation of a second day includes a visual indication associated with a second selected fare class, with the visual indication associated with the first selected fare class comprising a first color and the visual indication associated with the second selected fare class comprising a second color.

22. The system of claim 18 wherein the representation of a first day includes a visual indication associated with a first selected fare class and the representation of a second day includes a visual indication associated with a second selected fare class, with the visual indication associated with the first selected fare class comprising a first symbol and the visual indication associated with the second selected fare class comprising a second symbol.

23. The system of claim 18 wherein the availability server is further operable to determine a number of available fares for each available fare class.

24. The system of claim 23 wherein the availability server is further operable to generate a table identifying the number of available fares for each fare class for each of the plurality of days, and wherein the availability server is further operable to send data identifying the availability for each of the plurality of fare classes by sending the table to the reservation server.

25. The system of claim 24 wherein the request includes the identification of the origination location, the identification of the destination location, and an identification of at least one date in a predefined format.

26. The system of claim 18 wherein the reservation server comprises a web server.

27. The system of claim 26 wherein the reservation server sends the calendar display over a network to a remote client device for display on the remote client device.

28. The system of claim 18 wherein the reservation server is further operable to:
receive a selection of a travel date through a user interaction with the remote client device; and
generate a display list of available flights for the selected travel date.

29. The system of claim 28 wherein the display list of available flights further includes an identification of available fares for the available flights.

30. An article comprising at least one non-transitory machine-readable medium storing instructions for causing one or more processors to perform operations
comprising: receiving an identification of an origination location for generating a travel itinerary; receiving an identification of a destination location for generating the travel itinerary; determining, for a plurality of time periods and for travel from the origination location to the destination location, an availability for each of a plurality of fare classes, wherein each time period defines a time range from a beginning time to an ending time, with the plurality of time periods collectively spanning more than one date; generating a fare selection interface including a graphical representation for each of a plurality of available fare classes, each of the available fare classes having an availability for at least one of the plurality of time periods, the graphical representation of each available fare class in the fare selection interface including:

a visual indication associated with the fare class, a price associated with the fare class, and a selection control that allows a user to select whether the fare class is to be included in a calendar;

receiving an identification of a plurality of selected fare classes selected through the fare selection interface, the selection controls for each of the plurality of selected fare classes individually selected by a user from the plurality of available fare classes represented in the fare selection interface; and displaying a calendar having a representation of the plurality of time periods and the visual indications associated with the plurality of selected fare classes in a single calendar window, wherein the visual indication associated with each selected fare class is displayed in the calendar to indicate one or more of the time periods for which each selected fare class has availability.

31. The article of claim 30 wherein the calendar includes a visual indication associated with a first selected fare class for each time period in a first set of time periods and a visual indication associated with a second selected fare class for each time period in a second set of time periods.

32. The article of claim 31 wherein the visual indication associated with the first selected fare class comprises a first color and the visual indication associated with the second selected fare class comprises a second color.

33. The article of claim 31 wherein the visual indication associated with the first selected fare class comprises a first symbol and the visual indication associated with the second selected fare class comprises a second symbol.

34. The article of claim 30 wherein the at least one machine-readable medium stores instructions for causing one or more processors to perform further operations comprising receiving, prior to displaying the calendar, an identification of a requested travel date for generating the travel itinerary, wherein the displayed calendar includes a representation of a plurality of days including the requested travel date.

35. The article of claim 30 wherein the at least one machine-readable medium stores instructions for causing one or more processors to perform further operations comprising:
receiving a selection of a travel date through a user interaction with the user interface;
displaying a list of available flights for the selected travel date; and
displaying available fares for the available flights.

36. The article of claim 30 wherein determining, for a plurality of time periods and for travel from the origination location to the destination location, an availability for each of a plurality of fare classes comprises determining a number of available fares for each of the plurality of fare classes and the at least one machine-readable medium stores instructions for causing one or more processors to perform further operations comprising receiving an identification of a requested number of passengers for generating the travel itinerary, with each selected fare class having a number of available fares at least as numerous as the requested number of passengers.

37. An article comprising at least one non-transitory machine-readable medium storing instructions for causing one or more processors to perform operations comprising:
receiving an identification of an origination location for generating a travel itinerary; receiving an identification of a destination location for generating the travel itinerary; determining, for a plurality of days and for travel from the origination location to the destination location, an availability for each of a plurality of fare classes, wherein each time period defines a time range from a beginning time to an ending time, with the plurality of periods collectively spanning more than one date;
generating a fare selection interface including a graphical representation for each of a plurality of available fare classes, each of the available fare classes having an availability for at least one of the plurality of time periods, the graphical representation of each available fare class in the fare selection interface including:
a visual indication associated with the fare class, a price associated with the fare class, and a selection control that allows a user to select whether the fare class is to be included in a calendar;
receiving an identification of a plurality of selected fare classes selected through the fare selection interface, the selection controls for each of the plurality of selected fare classes individually selected by a user from the plurality of available fare classes represented in the fare selection module; and
generating calendar data for display in a single calendar window, the calendar data comprising a calendar display that includes a representation of the plurality of time periods and the visual indications of the plurality of selected fare classes, the visual indications in the calendar display identifying the availability for each of the plurality of selected fare classes for each of the plurality of time periods.

38. The article of claim 37 wherein the representation of each time period includes a visual indication associated with at least one selected fare class for the time period.

39. The article of claim 37 wherein the at least one machine-readable medium stores instructions for causing one or more processors to perform further operations comprising determining a number of available fares for each available fare class.

40. The article of claim 39 wherein the at least one machine-readable medium stores instructions for causing one or more processors to perform further operations comprising generating a table identifying the number of available fares for each fare class for each of the plurality of time periods.

41. A computer-implemented method for displaying fare availability, the method comprising:
receiving an identification of travel itinerary parameters for generating a travel itinerary for travel between an origination location and a destination location, wherein at least one of the travel itinerary parameters are identified through a selection on a user interface;
determining by operation of a processor, for a plurality of time periods and for travel from the origination location to the destination location, an availability for each of a plurality of fare classes, wherein each time period defines a time range from a beginning time to an ending time, with the plurality of time periods collectively spanning more than one date;
displaying on a display device a fare selection interface including a graphical representation for each of a plurality of available fare classes, each of the available fare classes having an availability for at least one of the plurality of time periods, the graphical representation of each available fare class in the fare selection interface including:
a visual indication associated with the fare class, a price associated with the fare class, and a selection control that allows a user to select whether the fare class is to be included in a calendar;
receiving an identification of a plurality of selected fare classes selected through the fare selection interface, the selection controls for each of the plurality of selected fare classes individually selected by a user from the plurality of available fare classes represented in the fare selection interface;
using a processor to generate data identifying the availability for each of the plurality of selected fare classes for each of the plurality of time periods; and
displaying on a display device a calendar having a representation of the plurality of time periods and the visual indications associated with the plurality of selected fare classes in a single calendar window, wherein the visual indication associated with each selected fare class is displayed in the calendar to indicate one or more of the time periods for which each selected fare class has availability.

42. The method of claim 41 further comprising:
receiving a selection of a particular time period on the displayed calendar; and
displaying a list of available bookings for the particular time period.

43. The method of claim 41 wherein the travel itinerary parameters are selected from the group consisting of an origination location, a destination location, a date, a number of passengers, a number of bookings, and a set of fare classes.

44. The method of claim 1, the calendar including a visual indication associated with a first selected fare class for a first one of the plurality of time periods, the first selected fare class having no availability for a second one of the plurality of time periods.

* * * * *

UNITED STATES PATENT AND TRADEMARK OFFICE
CERTIFICATE OF CORRECTION

| | | |
|---|---|---|
| PATENT NO. | : 8,788,303 B1 | Page 1 of 1 |
| APPLICATION NO. | : 10/875523 | |
| DATED | : July 22, 2014 | |
| INVENTOR(S) | : Kevin M. Krone et al. | |

It is certified that error appears in the above-identified patent and that said Letters Patent is hereby corrected as shown below:

In the Claims:

Column 13, Line 34, before "periods" insert -- displaying on a display device a calendar having a representation of the plurality of time --

Signed and Sealed this
Ninth Day of December, 2014

Michelle K. Lee
*Deputy Director of the United States Patent and Trademark Office*